(12) United States Patent
Lim et al.

(10) Patent No.: US 7,151,885 B2
(45) Date of Patent: Dec. 19, 2006

(54) METHOD AND APPARATUS FOR AUTOMATIC TRANSFER OF A PRE-RECORDED VIDEO PROGRAM TO A VIDEO CASSETTE RECORDER

(75) Inventors: Danny S. Lim, Santee, CA (US); Akira Yaegashi, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1157 days.

(21) Appl. No.: 10/033,068

(22) Filed: Oct. 26, 2001

(65) Prior Publication Data
US 2002/0126986 A1    Sep. 12, 2002

Related U.S. Application Data

(60) Provisional application No. 60/273,505, filed on Mar. 5, 2001.

(51) Int. Cl.
*H04N 5/91* (2006.01)
(52) U.S. Cl. .......................................... 386/83; 386/46
(58) Field of Classification Search .......... 386/125–52, 386/126
See application file for complete search history.

(56) References Cited

U.S. PATENT DOCUMENTS 5,938,734 A * 8/1999 Yao et al. .................. 709/232
6,711,344 B1 * 3/2004 Ito et al. ........................ 386/68

* cited by examiner

*Primary Examiner*—Robert Chevalier

(57) ABSTRACT

A method of transfer of a pre-recorded video program. Specifically, one embodiment of the present invention discloses a method for the automatic transfer of a pre-recorded video program from a digital video recorder (DVR) to a video cassette recorder (VCR). A user selects a pre-recorded video program and assigns an associated transfer period that includes a transfer date, record start time, and a record stop time. The associated transfer period associated with a selected pre-recorded program is entered as a record in a list of transfer records on the DVR. At the appointed associated transfer period, the DVR automatically sends a command to power on a remotely coupled VCR and begin recording. The DVR then transfers the selected video program to the VCR. The DVR can recognize timing conflicts between two transfer records and prompts a user to edit one of the conflicting records to avoid the timing conflict.

28 Claims, 9 Drawing Sheets

METHOD AND APPARATUS FOR AUTOMATIC TRANSFER OF A PRE-RECORDED VIDEO PROGRAM TO A VIDEO CASSETTE RECORDER

RELATED U.S. APPLICATION

This application claims priority to the co-pending provisional patent application, Ser. No. 60/273,505, entitled "Advanced Timer VCR Transfer For SONY SVR-2XXX and SAT-7X," with filing date Mar. 5, 2001, and assigned to the assignee of the present invention, and hereby incorporated by reference herein.

BACKGROUND OF THE INVENTION

1. Field of the Invention

The present invention relates to the field of digital video recorders. More specifically, embodiments of the present invention relate to the automatic transfer of a pre-recorded program from a digital video recorder to a video cassette recorder.

2. RELATED ART

Digital video recorders (DVRs) provide increased freedom and access to broadcasted television (TV) programs by recording numerous selected television program in digitized form on a hard drive. For example, users can simultaneously record a live broadcasting TV program while watching another pre-recorded TV program, including the program that is currently being recorded. Since the DVR continually records the broadcasted TV program, a user can pause viewing to answer the phone, go to the refrigerator, etc. The user can resume viewing the TV program at the point of pausing while still recording the live broadcast of the TV program.

The pre-recorded programs are stored in a finite hard disk located on the DVR. In the current mix of analog and digital technology, in some cases, it is necessary to transfer selected pre-recorded programs from the DVR to a remote video cassette recorder. For example, a typical configuration would have a television coupled to both a DVR and a VCR. In order to clear space in the hard drive of the DVR, it would be necessary to transfer prerecorded programs from the DVR to the VCR.

Heretofore, the transfer process was cumbersome for DVR users. The transfer process required constant user monitoring, especially when transferring multiple pre-recorded programs to the VCR. In order to effect a transfer of a pre-recorded program, a user would first have to manually select a pre-recorded program from a play list of pre-recorded television programs located on a DVR, and then select a prior art transfer feature of the DVR. The transfer would be effected immediately. Unfortunately, the user would have to wait until the transfer was completed before selecting an/or starting a separate transfer function. As such, the entire transfer procedure would require an intensive hands-on approach from the user.

Thus, a need exists for a less cumbersome process for transferring a pre-recorded television program from a digital video recorder to a video cassette recorder. Another need exists for a process of transferring a pre-recorded television program that requires less monitoring.

SUMMARY OF THE INVENTION

Embodiments of the present invention provide a method for automatic transfer of a television program. One embodiment of the present invention provides a method that provides for a less cumbersome process when effecting a transfer of a pre-recorded television program to the VCR. Additionally, another embodiment provides a process of transferring a pre-recorded television program that requires less monitoring.

These and other aspects of the present invention will no doubt become obvious to those of ordinary skill in the art after having read the following detailed description of the preferred embodiments which are illustrated in the various drawing figures.

Specifically, one embodiment of the present invention discloses a method for the automatic transfer of a pre-recorded television program from a digital video recorder (DVR) to a video cassette recorder (VCR). A user selects a pre-recorded television program from a play list of pre-recorded programs located on a DVR. The user then assigns an associated transfer period to that pre-recorded television program. The associated transfer period includes a transfer date, record start time, and a record stop time that indicates when the user would like the selected television program to be transferred to a remote VCR for recording.

The associated transfer period associated with a selected pre-recorded program is entered as a record in a list of transfer records. The list of transfer records is located on the DVR. At the appointed associated transfer period, the DVR automatically sends a command to power on the remotely coupled VCR. The DVR sends another command that starts the recording feature of the VCR. The DVR then transfers the selected television program that is corresponds with the associated transfer period to the VCR.

In another embodiment, at the time when a user assigns an associated transfer period to a selected pre-recorded program, the DVR can recognize timing conflicts between the associated transfer record and another transfer record. The DVR provides a user interface that prompts the user to edit one of the conflicting records to avoid the timing conflict. The editing includes changing the transfer period and/or deleting the transfer record from the list of transfer records.

DETAILED DESCRIPTION OF THE INVENTION

Figure 1:
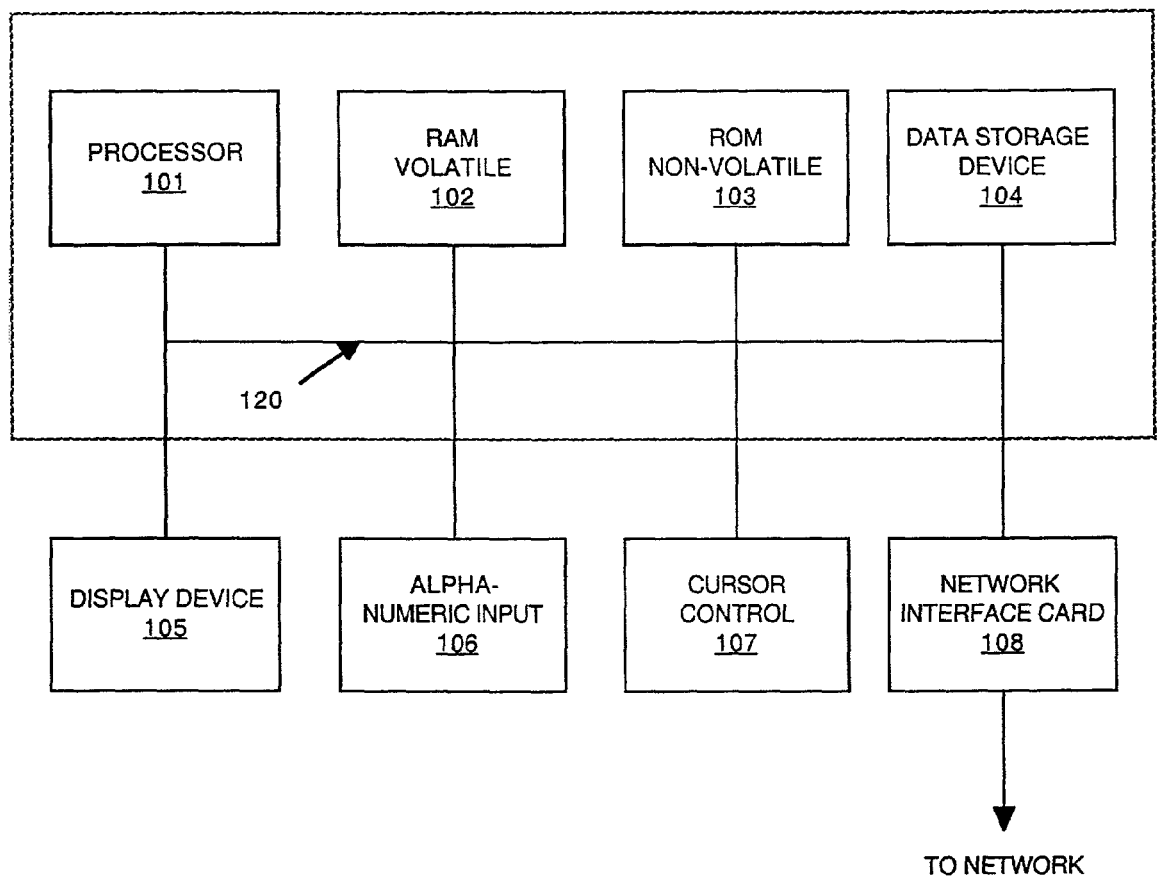
FIG. 1 illustrates a logical block diagram of an exemplary electronic device that is capable of transferring pre-recorded television programs automatically to a remote electronic device, in accordance with one embodiment of the present invention.

Reference will now be made in detail to embodiments of the present invention, a method for automatically transferring pre-recorded television programs to a remote electronic device, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," or "processing," or "computing," or "translating," or "calculating," or "determining," or "scrolling," or "displaying," or "recognizing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Referring now to FIG. 1, portions of the present invention are comprised of computer-readable and computer-executable instructions (process 800 and 900) which reside, for example, in computer-readable media of an electronic system, such as a electronic imaging device or a digital camera. FIG. 1 is a block diagram of exemplary embedded components of an exemplary electronic system 100, upon which embodiments of the present invention may be implemented.

FIG. 1 illustrates circuitry of an exemplary electronic system 100. Exemplary electronic system 100 includes an address/data bus 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, and a non-volatile memory 103 (e.g., read only memory (ROM), programmable ROM, flash memory, EPROM, EEPROM, etc.) coupled to the bus 120 for storing static information and instructions for the processor 101.

Exemplary electronic system 100 also includes a data storage device 104 (e.g., memory card, hard drive, etc.) coupled with the bus 120 for storing information and instructions. Data storage device 104 can be removable. Exemplary electronic system 100 also contains an electronic display device 105 coupled to the bus 120 for displaying information to a user. The display device 105 utilized with the electronic system 100 may be a liquid crystal device, cathode ray tube (CRT), field emission device (FED, also called flat panel CRT) or other display device suitable for creating graphical images.

Also included in electronic system 100 of FIG. 1 is an alphanumeric input device 106. Device 107 can communicate information and command selections to the central processor 101. System 100 also includes an optional cursor control or directing device 107 coupled to the bus for communicating user input information and command selections to the central processor 101.

With reference still to FIG. 1, an optional signal Input/Output device 108 which is coupled to bus 120 for providing a communication link between electronic system 100 and a network environment is described. As such signal Input/Output device 108 enables the central processor unit 101 to communicate with or monitor other electronic systems or analog circuit blocks coupled to a communication network.

Automatic Transfer of Pre-Recorded Television Programs

Accordingly, the present invention provides a method for automatically transferring pre-recorded television programs to a remote electronic device. Also, one embodiment of the present invention provides a method that provides for a less cumbersome process when effecting a transfer of a pre-recorded television program to the VCR. Additionally, another embodiment provides a process of transferring a pre-recorded television program requires less monitoring.

Figure 2:
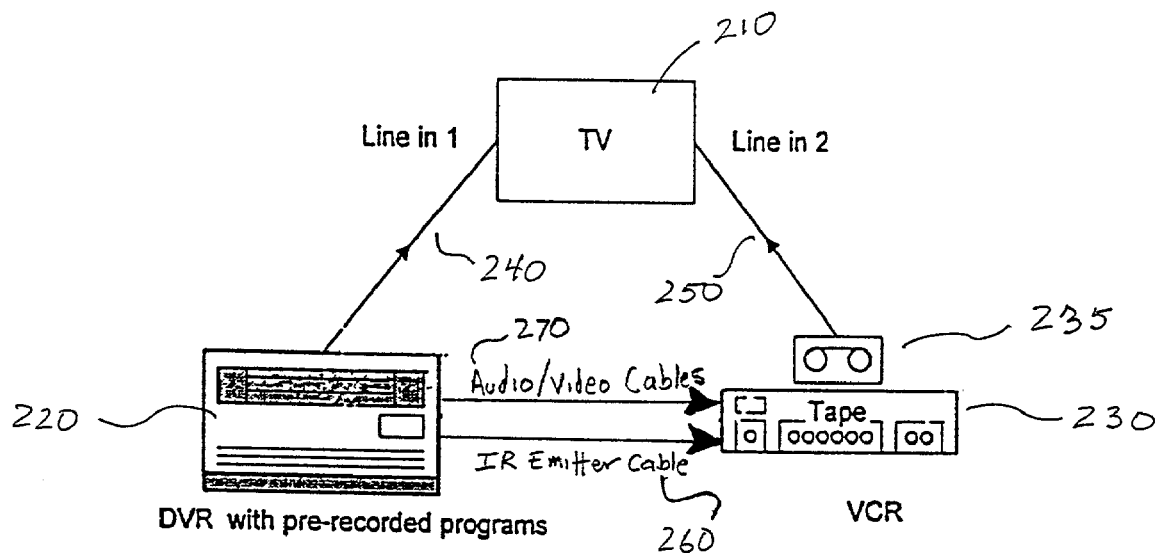
FIG. 2 illustrates a network environment including an exemplary digital video recorder and a video cassette recorder, in accordance with one embodiment of the present invention.

FIG. 2 illustrates an exemplary communication network 200 suitable for transferring pre-recorded television programs to a remote device, in accordance with one embodiment of the present invention are implemented. A television 210 is coupled to a digital video recorder (DVR) 220 via a communication link 240 (e.g., wired or wireless connection). As shown in FIG. 2, link 240 is also labeled line-in 1. The DVR 220 has stored inside a play list of pre-recorded programs. As is well known by those in the art, the play list contains digitally pre-recorded television programs. These programs were selected by a user to be recorded as the programs were broadcast and received at the DVR broadcast through wired or wireless communication networks.

The television 210 is simultaneously coupled to a video cassette recorder (VCR) 230 via a communication link 250 (e.g., wired or wireless connection) that is a dubbing system. As shown in FIG. 2, link 250 is also labeled line-in 2. A tape 235 is contained within the VCR for purposes of recording or dubbing data (e.g., television programs) that are transmitted to the VCR 230.

A communication link 260 is established between the DVR and the VCR in communication network 200. Link 260 can be any suitable medium for transferring data, including a wireless link (e.g., infrared (IR)), or a wired link (e.g., cable). Line 260 allows commands from the DVR 220 to be transferred from the DVR to the VCR. An audio/video link 270 provides a path for audio and/or video data to be transferred from the DVR to the VCR. In the present embodiment, pre-recorded television programs can be transferred from the DVR 220 to the VCR 230.

Figure 8:
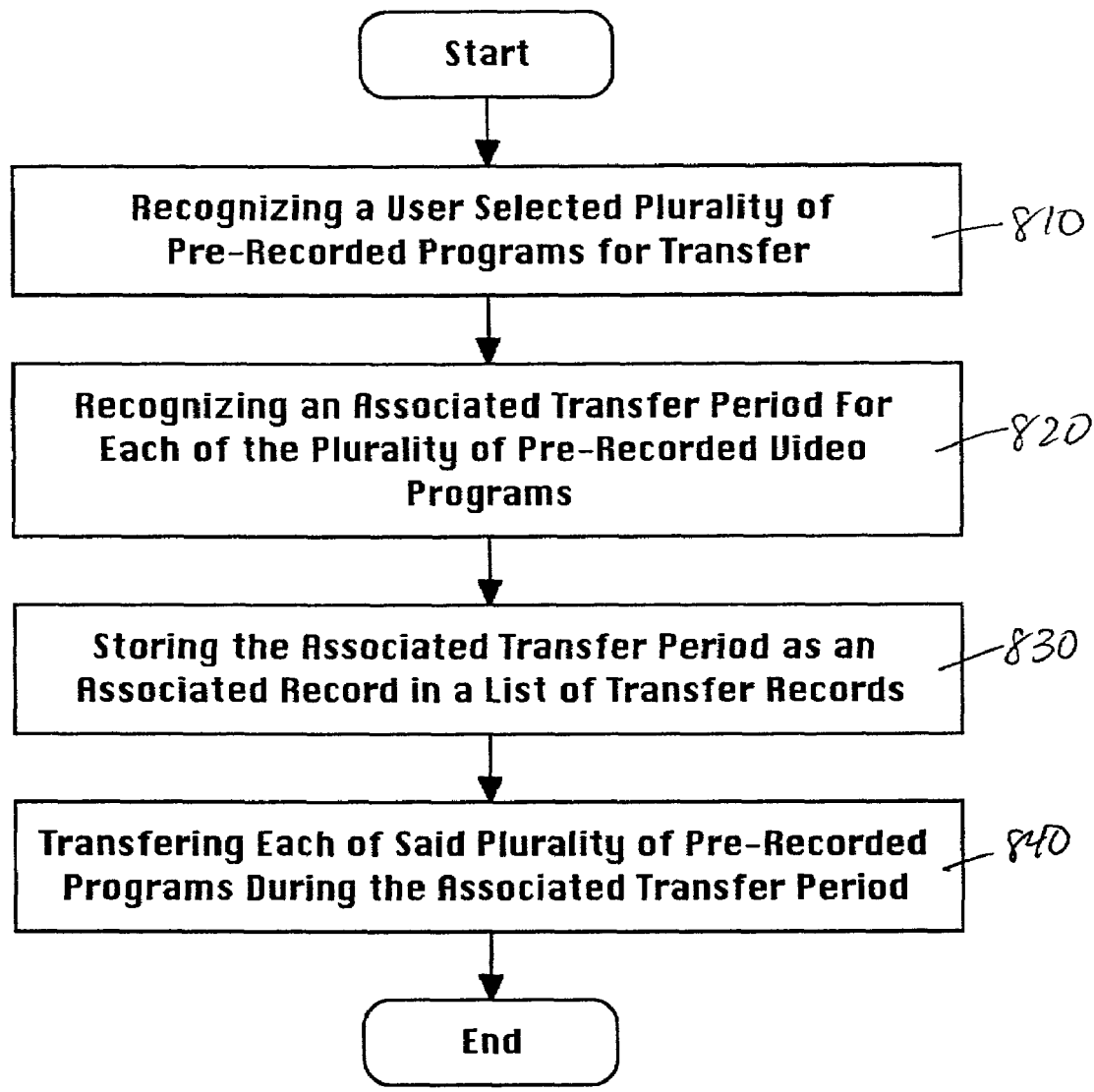
FIG. 8 is a flow diagram illustrating steps in a method for transferring pre-recorded television programs to a remote electronic device, in accordance with one embodiment of the present invention.

FIG. 8 illustrates a flow diagram of steps of a process 800 for automatically transferring pre-recorded television programs to a remote VCR, in accordance with one embodiment of the present invention. The network 200 provides a communications architecture that gives the DVR 220 the ability to control the timed dubbing of selected programs to the VCR 230.

In step 810, the present embodiment recognizes a plurality of pre-recorded television programs that are selected for transfer. These selected programs are selected by a user from a play list of pre-recorded programs that are stored on the DVR 220.

In step 820, the present embodiment recognizes an associated transfer period for each of the plurality of pre-recorded television programs that are selected for transfer. Each transfer period designates a time period for transferring an associated pre-recorded television program from the DVR 220 to the VCR 230. In one embodiment, the transfer period designates a date, start time, and stop time. The time is referenced to a system clock controlled and maintained by the DVR 220.

In step 830, once the pre-recorded programs are selected and associated transfer periods have been set for each of the selected programs, the present embodiment will store information pertaining to the selected programs and their associated transfer period into a transfer list or queue. For example, in one embodiment the transfer list contains the transfer period and routing information to the associated pre-recorded television program that is selected for transfer. Each record contains information pertaining to one transfer period and its associated pre-recorded television program. In one embodiment, the records can be queued in the transfer list in accordance to time for transfer.

In step 840, the present embodiment then transfers the selected pre-recorded television programs to the remote VCR 230 at the appropriate transfer period. This is done for each of the records in the transfer queue. In the meantime, the user can use other DVR functions normally, such as, watch live TV. This advanced transfer function automatically provides the convenience of VCR dubbing from a play list of pre-recorded programs on a DVR without constant monitoring.

Figure 3:
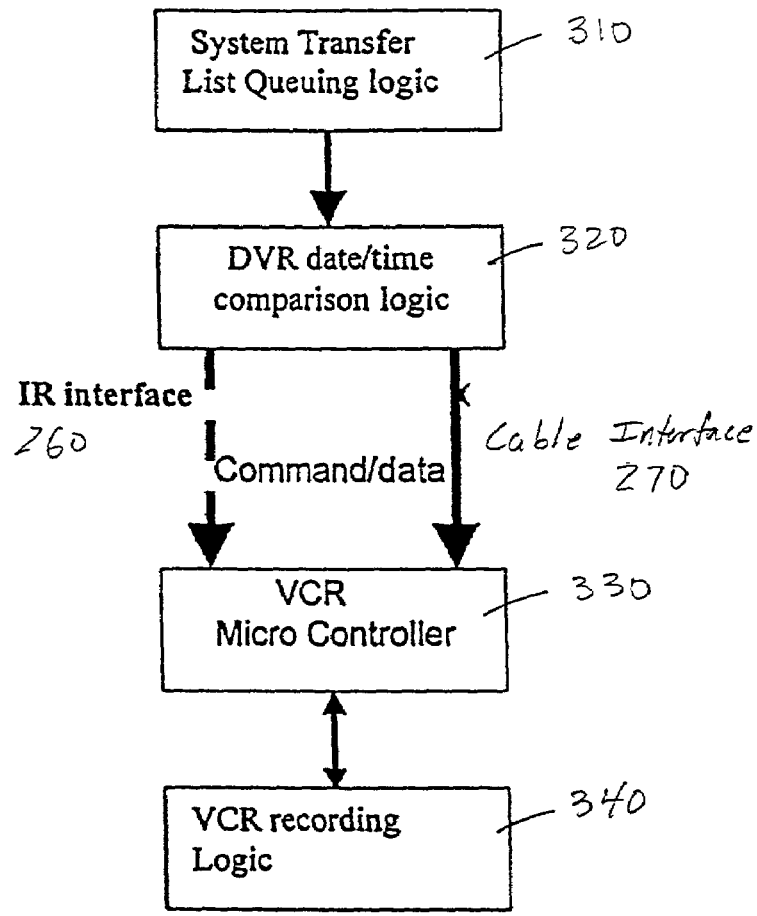
FIG. 3 illustrates a functional block diagram of the digital video recorder and video cassette recorder of FIG. 2, in accordance with one embodiment of the present invention.

FIG. 3 illustrates a functional block diagram 300 showing the device interfaces of FIG. 2 for controlling the automatic transfer of pre-recorded programs from the DVR 220 to the VCR 230, in accordance with one embodiment of the present invention. FIG. 3 also shows the data flow from the DVR 220 to the VCR 230.

The host system on the DVR 220 contains the logic for creating and maintaining records in the transfer list in functional block 310. Records maintained in the transfer list by block 310 are sent to functional block 320.

Functional 320 contains a transfer manager for processing records in the transfer list, in accordance with one embodiment of the present invention. When a transfer period coincides with the date/time as referenced and maintained by the DVR 220, the DVR begins the process of transferring the associated television program to the remote VCR 230.

The host system on the DVR 220 communicates with the VCR 230 through the communications link 260. As discussed previously, link 260 could be an IR emitter with a specialized communications interface. A VCR microcontroller provides the interfacing for communications between the DVR 220 and the VCR 230 in functional block 330. Block 330 allows the DVR 220 to send commands to the VCR 230, such as, powering on the VCR, start recording, and stop recording. Block 330 also allows the VCR 230 to receive audio and video information from the DVR 220 through an audio/video cable interface 270.

Block 340 of FIG. 3 provides the functional recording logic for the VCR 230. This enables the VCR 230 to take commands from the VCR micro-controller in block 330 to start recording and to stop recording, in accordance with one embodiment of the present invention.

Figure 4:
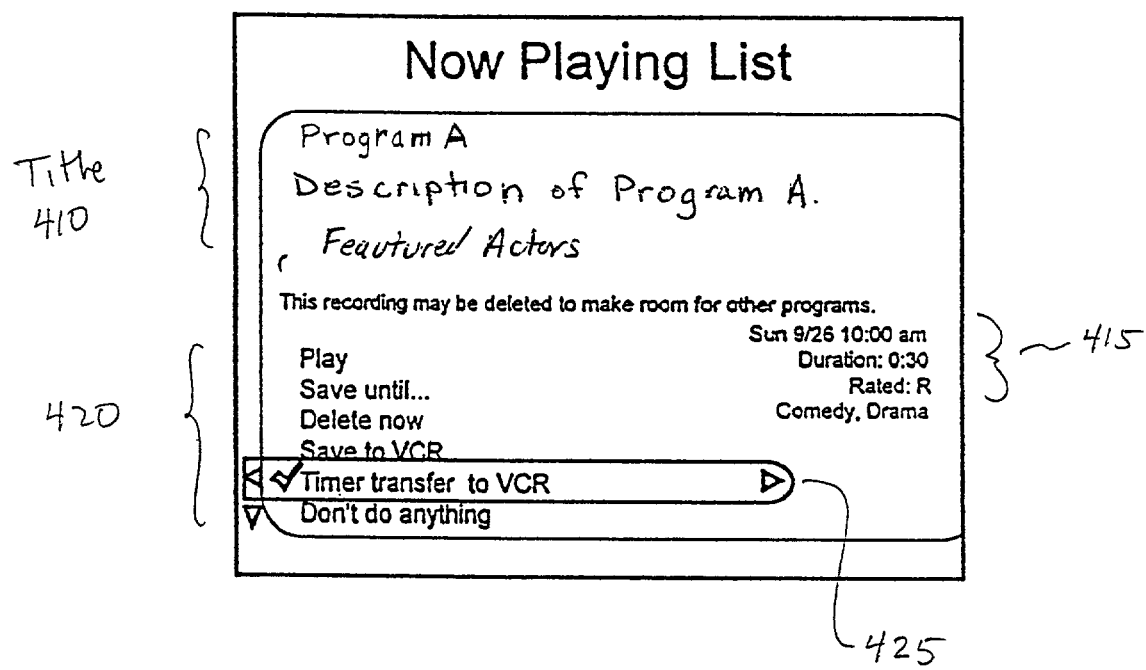
FIG. 4 illustrates a diagram of an exemplary user interface for selecting the transfer feature, in accordance with one embodiment of the present invention.

FIG. 4 is a block diagram of a user interface 400 used to select a pre-recorded television program for transfer, in accordance with one embodiment of the present invention. To save pre-recorded programs onto the VCR, a user picks a pre-recorded program from a play list (not shown). As discussed previously, the play list contains all the pre-recorded television programs that are stored on the DVR 220. A user selects one of the programs on the play list for programming a transfer period to the remote VCR 230.

Interface 400 shows that the user has selected Program A from the play list. Title area 410 provides the title of the selected pre-recorded program and gives a brief description of the program. Also actors featured in program A are listed. Interface 400 also shows information 415 that describes the original broadcast time and the duration of the pre-recorded television program.

Interface 400 also provides a list of options 420 to the user for selection. The list of options 420 could contain the following selections: "play," "save until . . . ," "delete now," "save to VCR," "timer transfer to VCR," and "don't do anything." The 'Timer transfer to VCR' option will bring up the Set VCR Transfer Date/Time menu. In order to program a transfer period associated with the selected pre-recorded television program in FIG. 4, the user then selects the 'Timer Transfer to VCR' option 425. By selecting this option, the user is requesting a user interface for programming the associated transfer period.

Figure 5:
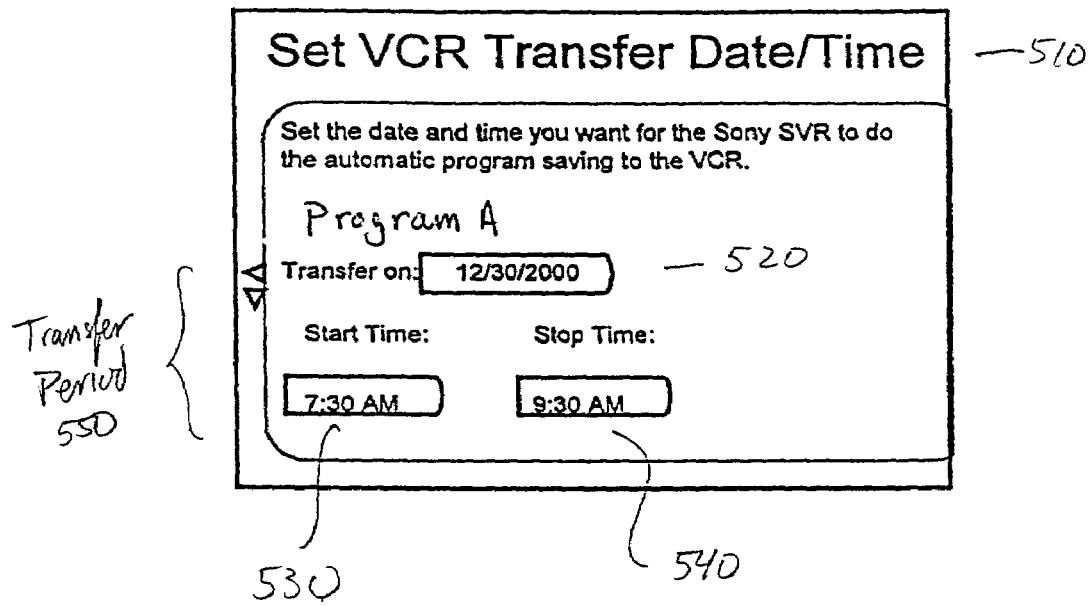
FIG. 5 illustrates a diagram of a user interface for selecting and programming a transfer record for an associated television program, in accordance with one embodiment of the present invention.

FIG. 5 illustrates an exemplary user interface 500 for programming an associated transfer period for program A as selected in FIG. 4. Interface 500 has a menu 510 that is titled: "Set VCR Transfer Date/Time," and automatically appears on the interface 500 with the user. The Set VCR Transfer Date/Time menu 510 provides three areas for entry by the user: the transfer date 520, the start time 530, and the stop time 540. These three entries 520, 530, and 540 comprise the transfer period 550 for program A.

In accordance with one embodiment, the date on the recording starting time will be in the 'month/day/year' format. For example, if the user wants the transfer date to be Dec. 30, 2000, the user will enter the date as "Dec. 30, 2000" as is shown in entry 520. The start time and stop time will be hours and minutes, with the hours in a 12 hour format. The user is required to enter only the hour and minute values, along with an AM or PM designation for the hour. For example, the start and stop times entered by the user from a remote controller will show on the screen as follows: start time at 7:30 AM for entry 530, and stop time at 9:30 AM for entry 540.

In one embodiment, the entries 520, 530, and 540 are entered by a user from a remote controller. Thereafter, the present embodiment places this transfer period into a record in the transfer list maintained by the DVR 220. The present embodiment then returns to the play list interface (as mentioned previously) after exiting from the Set VCR Transfer Date/Time menu in interface 500 for more program transfers. A user can repeat this same selection process from the play list to set up multiple program transfers from the DVR 220 to the remote VCR 230.

In accordance with another embodiment, a transfer manager located at the DVR 220 processes the record for program A in the transfer list by checking the user selected transfer period 550. When the date/time referenced and maintained by the DVR 220 coincides with the user set transfer period 550, the DVR 220 issues a "power on" command to the VCR 230. This will turn on the VCR. After some delay, the DVR 220 issues a "record" command to the VCR 230. This starts the recording feature of the VCR 230. After the VCR client receives each of these commands from the transfer manager at the DVR 220, the requests are processed by the recording task manager.

In addition, in accordance with another embodiment of the present invention, any header information regarding the associated pre-recorded television program to be transferred and recorded can be sent by the transfer manager from the DVR 220 to the VCR 230. This information can be included in the dubbed recording at the VCR 230.

In accordance with another embodiment of the present invention, the transfer manager arranges all the records in the transfer list by order of transfer period. For example, the first entry in the transfer list is the record that has a transfer period that is closest in time. In other words, that record will be the first to be transferred according to its associated transfer period. After a pre-recorded program is transferred to the VCR 230 successfully, the transfer manager task deletes this program from the transfer list. The next record with an associated pre-recorded television program to be transferred is moved up to the top of the transfer list. The transfer manager repeats this transfer process until the transfer queue is empty.

The transfer manager in the DVR 220, as describe in functional block 320 of FIG. 3, also provides comparison logic between records that are maintained in the transfer list. For example, block 320 compares transfer periods between associated records in the transfer list to avoid conflicts between transfer periods. Since the DVR 220 can only transfer one program at a time over the communication link 260 and data link 270, conflicts between transfer periods must be avoided. Block 320 ensures that a transfer and recording occurring during one transfer period in one record is not interrupted by another transfer period in another record.

Figure 7:
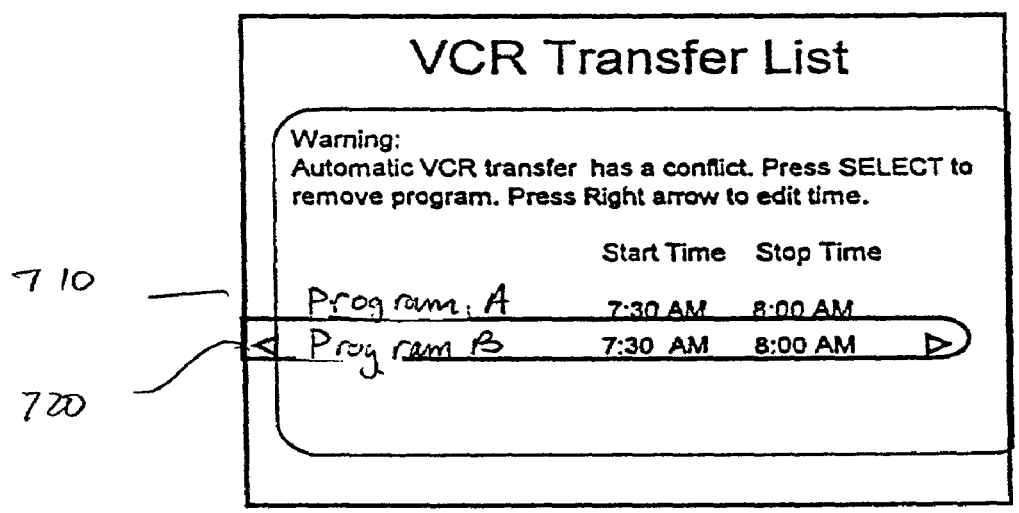
FIG. 7 shows a diagram of a user interface illustrating a conflict between two transfer records, in accordance with one embodiment of the present invention.
Figure 9:
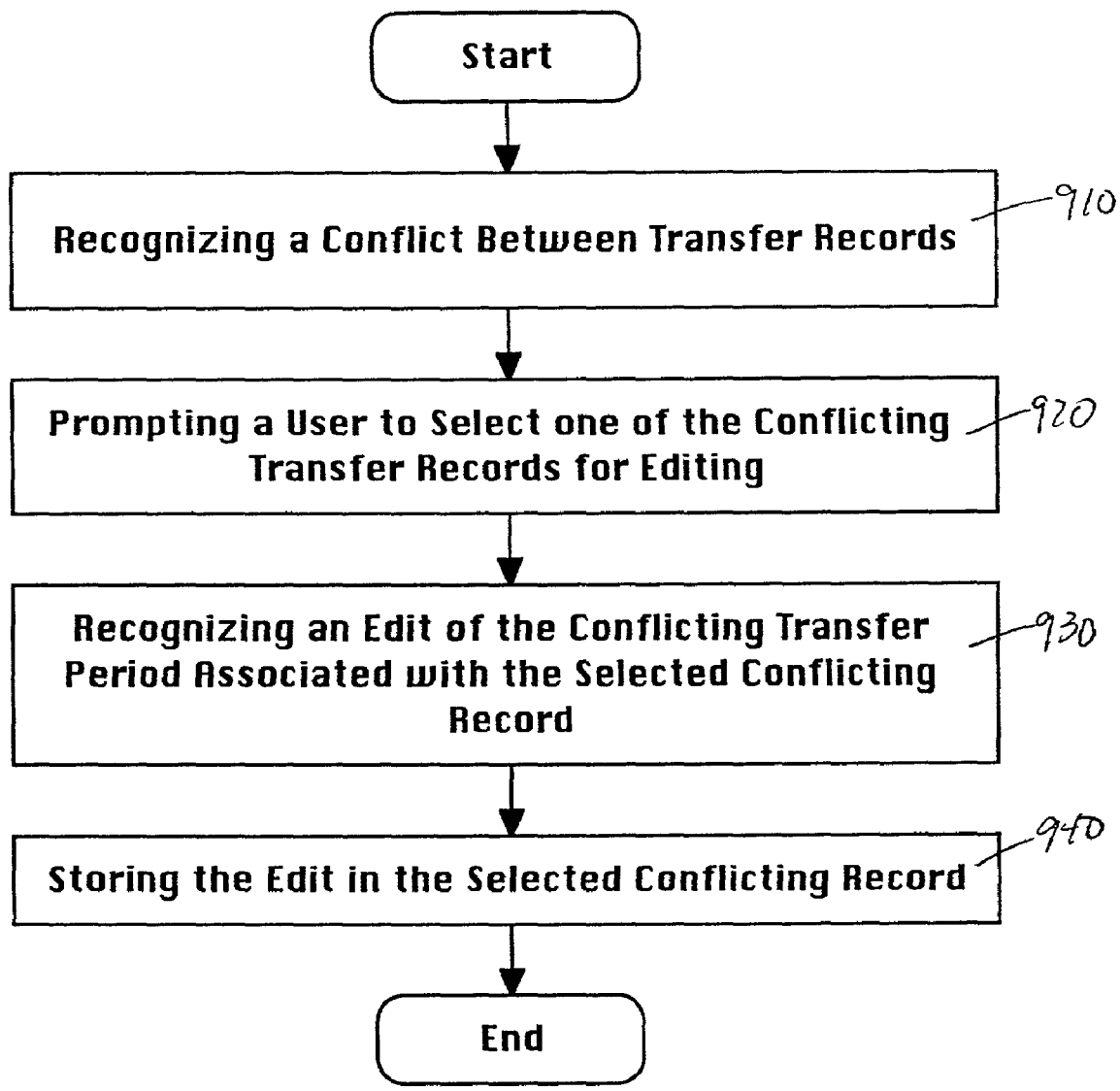
FIG. 9 is a flow diagram illustrating steps in a method for resolving conflicts between transfer records, in accordance with one embodiment of the present invention.

FIG. 9, in combination with FIG. 7, illustrates a method for resolving conflicts between transfer periods in the transfer list. FIG. 7 illustrates an exemplary user interface used for resolving conflicts between two transfer periods in two associated records in a transfer list.

In step 910, the present embodiment recognizes a conflict in transfer periods between two records in the transfer list. In the present embodiment, the transfer manager can detect a conflict after a user exists from the Set VCR Transfer Date/Time menu of FIG. 5. The transfer manager in the DVR 220 should detect if a conflict exists between the recently entered transfer period and any previously entered transfer periods with their respective associated records. The conflicting transfer periods are associated with the conflicting records. There might be more than two records that are in conflict. The user interface 700 will inform the user that a conflict exists.

In step 920, the transfer manager in the DVR 220 prompts the user to select one of the conflicting records for editing. In FIG. 7, the transfer manager presents the interface 700 and shows that a conflict exists between the record 710 of program A and record 720 of program B. The conflict exists because the transfer periods are identical. As shown in FIG. 7, the user has selected record 720 for editing, as indicated by the highlighting of the record 720.

As shown in FIG. 7, the interface 700 allows the user to select one of the conflicting records for deletion. In that case, the conflicting record will be deleted from the transfer list, and the conflict will be nullified.

An editing of the transfer period is also provided in interface 700. A user can edit or change the transfer period for the selected entry 720. In step 930, the transfer manager recognizes the edit of the transfer period associated with the selected conflicting record. In step 940, the edited transfer period is entered and stored in the record associated with the selected conflicting record that is edited. Thereafter, the transfer manager will perform another comparison between records in the transfer list to determine if another conflict between transfer periods was created.

Figure 6:
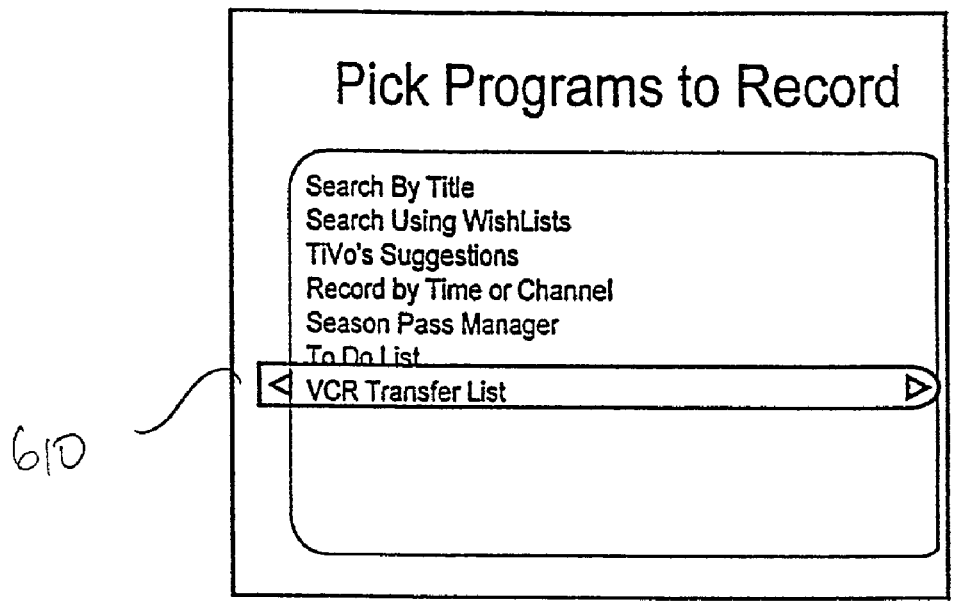
FIG. 6 illustrates a diagram of an exemplary user interface for viewing a transfer list, in accordance with one embodiment of the present invention.

FIG. 6 illustrates a user interface 600 for editing purposes, in accordance with one embodiment of the present invention. A user can use interface 600 to show the current VCR transfer status. By selecting the VCR transfer list option 610, the VCR transfer list will show all the records of the transfer list. Thereafter, the user may select a program for removal or editing of the start and stop times.

While the methods of embodiments illustrated in flow charts 800 and 900 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

A method for automatic transfer of pre-recorded programs to a remote electronic device, is thus described. While the present invention has been described in particular embodiments, it should be appreciated that the present invention should not be construed as limited by such embodiments, but rather construed according to the below claims.

What is claimed is:

1. A method of program transfer comprising:
   a) recognizing a plurality of pre-recorded programs selected for transfer by a user;
   b) recognizing an associated transfer period programmed by said user for each of said plurality of pre-recorded programs selected for transfer;
   c) transferring each of said plurality of pre-recorded programs selected for transfer during said associated transfer period to a remote electronic device; and
   i) after a), for each of said plurality of pre-recorded programs selected for transfer, prompting said user to program said associated transfer period.

2. The method of program transfer as described in claim 1, further comprising:
   d) for each of said plurality of pre-recorded programs selected for transfer, storing said associated transfer period as an associated record in a list of transfer records.

3. The method of program transfer as described in claim 1, wherein c) comprises:
   automatically transferring each of said plurality of pre-recorded programs selected for transfer during said associated transfer period.

4. The method of program transfer as described in claim 1, wherein said associated transfer period comprises for each of said plurality of pre-recorded programs selected for transfer:
   an associated date selection;
   an associated record start time; and
   an associated record stop time.

5. The method of program transfer as described in claim 1, further comprising:
   for each of said plurality of pre-recorded programs selected for transfer, at the start of said associated transfer period, communicating with said remote device to power on said remote device and to begin recording.

6. The method of program transfer as described in claim 1, further comprising:
   for each of said plurality of pre-recorded programs selected for transfer, at the end of said associated transfer period, communicating with said remote device to stop recording.

7. The method of program transfer as described in claim 1, wherein a first electronic device that is a digital video recorder performs a), b), and c).

8. The method of program transfer as described in claim 1, wherein said remote electronic device is a video cassette recorder.

9. The method of program transfer as described in claim 1, further comprising:
   d) recognizing a conflict in transfer periods between conflicting records; and
   e) prompting said user to resolve said conflict.

10. The method of program transfer as described in claim 9, further comprises:
    recognizing an edit of a transfer period of one of said conflicting records, said edit including deletion of said one of said conflicting records.

11. A method of program transfer comprising:
    a) recognizing a first selection of a first pre-recorded video program from a plurality of pre-recorded programs for transfer to a remote electronic device;
    b) recognizing a first transfer period associated with said first selection;
    c) recognizing a second selection of a second pre-recorded video program from said plurality of pre-recorded programs for transfer to said remote electronic device;
    d) recognizing a second transfer period associated with said second selection;
    e) automatically transferring said first pre-recorded video program to said remote electronic device during said first transfer period; and
    f) automatically transferring said second pre-recorded video program to said remote electronic device during said second transfer period, and wherein a user selects said first selection, said first transfer period, said second selection and said second transfer period.

12. The method of program transfer as described in claim 11, further comprising:
    storing said first selection and said first transfer period as a first record in a list of transfer records; and
    storing said second selection and said second transfer period as a second record in a list of transfer records.

13. The method of program transfer as described in claim 11, further comprising:
    at the start of said first transfer period, communicating with said remote device to power on said remote device and to begin recording;
    at the end of said first transfer period, communicating with said remote device to stop recording;
    at the start of said second transfer period, communicating with said remote device to power on said remote device and to begin recording: and
    at the end of said second transfer period, communicating with said remote device to stop recording.

14. The method of program transfer as described in claim 11, further comprising:
    determining if a conflict exists between said first transfer period and said second transfer period;
    if said conflict exists, prompting a user to resolve said conflict; and
    recognizing an edit, to include deletion, of one of said first or second transfer period.

15. The method of program transfer as described in claim 11, wherein said video program is a television program.

16. A computer system comprising:
    a processor; and
    a computer readable memory coupled to said processor and containing program instructions that, when executed, implement a method of program transfer, comprising:
    a) recognizing a plurality of pre-recorded programs selected for transfer by a user;
    b) recognizing an associated transfer period programmed by said user for each of said plurality of pre-recorded programs selected for transfer;
    c) transferring each of said plurality of pre-recorded programs selected for transfer during said associated transfer period to a remote electronic device; and
    i) after a), for each of said plurality of pre-recorded programs selected for transfer, prompting said user to program said associated transfer period.

17. The computer system as described in claim 16, wherein said method of program transfer further comprises:
    d) for each of said plurality of pre-recorded programs selected for transfer, storing said associated transfer period as an associated record in a list of transfer records.

18. The computer system as described in claim 16, wherein c) in said method of program transfer further comprises:
    automatically transferring each of said plurality of pre-recorded programs selected for transfer during said associated transfer period.

19. The computer system as described in claim 16, wherein said associated transfer period comprises for each of said plurality of pre-recorded programs selected for transfer:
    an associated date selection;
    an associated record start time; and
    an associated record stop time.

20. The computer system as described in claim 16, wherein said method of program transfer further comprises:

for each of said plurality of pre-recorded programs selected for transfer, at the start of said associated transfer period, communicating with said remote device to power on said remote device and to begin recording.

21. The computer system as described in claim 16, wherein said method of program transfer further comprises:
for each of said plurality of pre-recorded programs selected for transfer, at the end of said associated transfer period, communicating with said remote device to stop recording.

22. The computer system as described in claim 16, wherein a first electronic device that is a digital video recorder performs a), b), and c).

23. The computer system as described in claim 16, wherein said remote electronic device is a video cassette recorder.

24. The computer system as described in claim 16, wherein said method of program transfer further comprises:
d) recognizing a conflict in transfer periods between conflicting records in said list of transfer records; and
e) prompting said user to resolve said conflict.

25. The computer system as described in claim 24, wherein said method of program transfer further comprises:
recognizing an edit of a transfer period of one of said conflicting records, said edit including deletion of said one of said conflicting records.

26. A method of program transfer comprising:
a) recognizing a plurality of pre-recorded programs selected for transfer by a user;
b) recognizing an associated transfer period programmed by said user for each of said plurality of pre-recorded programs selected for transfer; and
c) transferring each of said plurality of pre-recorded programs selected for transfer during said associated transfer period to a remote electronic device, wherein said associated transfer period comprises for each of said plurality of pre-recorded programs selected for transfer:
an associated date selection;
an associated record start time; and
an associated record stop time.

27. A method of program transfer comprising:
a) recognizing a plurality of pre-recorded programs selected for transfer by a user;
b) recognizing an associated transfer period programmed by said user for each of said plurality of pre-recorded programs selected for transfer;
c) transferring each of said plurality of pre-recorded programs selected for transfer during said associated transfer period to a remote electronic device
d) recognizing a conflict in transfer periods between conflicting records; and
e) prompting said user to resolve said conflict.

28. A computer system comprising:
a processor; and
a computer readable memory coupled to said processor and containing program instructions that, when executed, implement a method of program transfer, comprising:
a) recognizing a plurality of pre-recorded programs selected for transfer by a user;
b) recognizing an associated transfer period programmed by said user for each of said plurality of pre-recorded programs selected for transfer; and
c) transferring each of said plurality of pre-recorded programs selected for transfer during said associated transfer period to a remote electronic device, wherein said associated transfer period comprises for each of said plurality of pre-recorded programs selected for transfer:
an associated date selection;
an associated record start time; and
an associated record stop time.

* * * * *